United States Patent
Yaguchi et al.

(10) Patent No.: US 10,670,099 B2
(45) Date of Patent: Jun. 2, 2020

(54) FRICTION MATERIAL

(71) Applicant: NISSHINBO BRAKE, INC., Tokyo (JP)

(72) Inventors: Mitsuaki Yaguchi, Gunma-Ken (JP); Shinya Kaji, Gunma-Ken (JP); Tomomi Iwai, Gunma-Ken (JP)

(73) Assignee: NISSHINBO BRAKE INC., Nihonbashi, Chuo-ku, Tokyo (JP)

( * ) Notice: Subject to any disclaimer, the term of this patent is extended or adjusted under 35 U.S.C. 154(b) by 148 days.

(21) Appl. No.: 15/766,815

(22) PCT Filed: Oct. 3, 2016

(86) PCT No.: PCT/JP2016/079277
§ 371 (c)(1),
(2) Date: Apr. 8, 2018

(87) PCT Pub. No.: WO2017/061373
PCT Pub. Date: Apr. 13, 2017

(65) Prior Publication Data
US 2018/0298971 A1    Oct. 18, 2018

(30) Foreign Application Priority Data
Oct. 8, 2015 (JP) ................. 2015-199958

(51) Int. Cl.
*F16D 69/02* (2006.01)
*C09K 3/14* (2006.01)

(52) U.S. Cl.
CPC .......... *F16D 69/026* (2013.01); *C09K 3/1436* (2013.01); *C09K 3/1463* (2013.01); *F16D 2200/0073* (2013.01)

(58) Field of Classification Search
CPC . C08K 3/042; C08K 3/04; C08K 3/11; C08K 7/12; F16D 69/026; F16D 69/027; F16D 2200/0073; C09K 3/149; C09K 3/1436; C09K 3/1463
See application file for complete search history.

(56) References Cited

U.S. PATENT DOCUMENTS

| | | | | |
|---|---|---|---|---|
| 9,470,283 B2 * | 10/2016 | Unno | ............. | F16D 69/026 |
| 9,970,501 B2 * | 5/2018 | Hattori | ............. | F16D 69/026 |
| 10,302,165 B2 * | 5/2019 | Kikudome | ............. | F16D 69/026 |
| 10,487,251 B2 * | 11/2019 | Kamei | ............. | C09K 3/149 |
| 2002/0086159 A1 * | 7/2002 | Horiya | ............. | F16D 69/026 |
| | | | | 428/408 |
| 2007/0148428 A1 * | 6/2007 | Suzuki | ............. | F16D 69/026 |
| | | | | 428/292.1 |
| 2008/0156226 A1 * | 7/2008 | Kitami | ............. | F16D 69/026 |
| | | | | 106/36 |
| 2013/0220747 A1 * | 8/2013 | Kikudome | ............. | F16D 69/026 |
| | | | | 188/251 A |
| 2013/0220748 A1 * | 8/2013 | Unno | ............. | F16D 69/026 |
| | | | | 188/251 A |
| 2014/0342899 A1 * | 11/2014 | Itami | ............. | F16D 69/028 |
| | | | | 501/95.2 |
| 2016/0230827 A1 * | 8/2016 | Kaji | ............. | F16D 69/026 |
| 2016/0289126 A1 * | 10/2016 | Kitami | ............. | F16D 69/023 |
| 2016/0356332 A1 * | 12/2016 | Yaguchi | ............. | C08L 61/34 |

FOREIGN PATENT DOCUMENTS

| | | | | |
|---|---|---|---|---|
| JP | 1997-031440 | | 2/1997 | |
| JP | 2012-255052 | | 12/2012 | |
| WO | WO-2015098434 A1 * | | 7/2015 | ............. C08L 61/14 |

OTHER PUBLICATIONS

Wang et al (Crystal Structure of Zirconia by Rietveld Refinement, Science in China vol. 42 No. 1 Jan. 1999, p. 80-86).*

* cited by examiner

*Primary Examiner* — Jun Li
(74) *Attorney, Agent, or Firm* — Apex Juris PLLC; Tracy M Heims

(57) ABSTRACT

[Object]
The present invention provides a friction material used for a disc brake pad, which is manufactured by forming a non-asbestos-organic (NAO) friction material composition that does not contain a copper component, which provides an excellent wear resistance and a highly stable braking effectiveness even after being subjected to a history of high temperatures and high loads.
[Means to Resolve]
The friction material composition for the friction material molding containing, as an inorganic friction modifier, 10-40 weight % of a monoclinic zirconium oxide with an average particle diameter of 1-8 μm relative to the total amount of the friction material composition, 1.5 weight % or more of a resilient graphitic carbon as a carbon type lubricant relative to the total amount of the friction material composition, and a calcined coke also as a carbon type lubricant, where total amount of the resilient graphitic carbon and the calcined coke is 2-8 weight % relative to the total amount of the friction material composition and a weight ratio of the resilient graphitic carbon and the calcined coke is 4:6-8:2. It is preferable that the friction material composition contains 2-6 weight % of the layered mineral particle as the inorganic friction modifier relative to the total amount of the friction material composition and that the layered mineral particle is mica.

3 Claims, No Drawings

FRICTION MATERIAL

DETAILED DESCRIPTION

Field of the Invention

This invention relates to a friction material used for a disc brake pad, which is manufactured by forming a non-asbestos-organic (NAO) friction material composition that does not contain a copper component.

Background of the Invention

Conventionally, a disc brake is used as a braking device for a passenger car, and a disc brake pad, which is formed by adhering a friction material on a metal base member, is used as a friction member thereof.

The friction material used for the disc brake pad is mainly classified into the following three types.

<Semi-Metallic Friction Material>

A semi-metallic friction material is a friction material that contains 30 weight % or more but less than 60 weight % of a steel fiber relative to the total amount of a friction material composition.

<Low Steel Friction Material>

A low steel friction material is a friction material that contains a steel fiber in a part of a fiber base material and also contains less than 30 weight % of the steel fiber relative to a friction material composition.

<Non-Asbestos-Organic (NAO) Friction Material>

A NAO friction material is a friction material that does not contain a steel type fiber such as a steel fiber and a stainless fiber as a fiber base material.

Recently, quietness or stillness in braking operation is in demand, and a friction material using NAO friction material which generates less brake noise has been widely used.

Conventionally, for a NAO friction material, in order to meet the demand of the required performance, 5-20 weight % of a copper component is added as an essential component in the form such as a fiber or a particle of a copper or a copper alloy relative to the total amount of the friction material composition.

However, recently, it is suggested that the above-described friction material, when braking, discharges the copper as an abrasion powder and that the discharged copper flows in a river, lake, and/or ocean, and then the copper possibly contaminates an area around the discharged copper.

Because of these background, for example, California State (CA) and Washington State (WA) of the United States of America passed a bill to prohibit the sales of the friction member using the friction material containing 5 weight % or more of the copper component relative to the total amount of the friction material composition, an act of assembling the subject friction member in a new car from the year of 2021, and sales of the friction member using the friction material containing 0.5 weight % or more of the copper component relative to the total amount of the friction material composition and an act of assembling the subject friction member in a new car several years later from 2021.

Then, as this type of laws and regulations are expected to be spread out in the world from now on, the elimination of the copper component contained in the NAO friction material is urgently needed.

The following Patent Documents 1 and 2 are examples of the prior arts. Patent Document 1 describes a non-asbestos friction material composition that has a binder, an organic filler, an inorganic filler, and a fiber base material, and discloses a non-asbestos friction material that contains, as a copper element, 5 mass % or less of a copper component, 0.5 mass % or less of a metal fiber other than the copper and the copper alloy, a titanate and a zirconium oxide with a particle diameter of 30 μm or less, and 10-35 mass % of the titanate but does not contain a zirconium oxide with the particle diameter over 30 μm. Patent Document 1 also discloses a friction member (disc brake pad) that is manufactured by forming the non-asbestos friction material composition, which is affixed on a metal back plate.

However, the friction material in Patent Document 1, when an excessive amount of the zirconium oxide is added, has a problem of reducing the wear resistance after being subjected to a history of high temperatures and high loads.

A monoclinic zirconium oxide is characterized to start crystal transition from about a temperature of 800 centigrade and to cause about 20% volumetric shrinkage to change to a tetragonal system, and when the friction material is subject to the history of high temperatures and high loads, the zirconium oxide shrinks and tends to fall out from the matrix of the friction material.

Patent Document 2 describes a friction material, which has a fiber base material, a resin binder, a zirconium oxide, and other fillers, and is characterized in that the zirconium oxide is a stabilized zirconia stabilized by either one of a calcia (CaO), an yttria ($Y_2O_3$), and a magnesia (MgO).

Patent Document 2 uses the stabilized zirconium oxide which is stabilized in cubic to inhibit anomalous volume change of the zirconium oxide and to inhibit the reduction of the wear resistance; however, it increases the cost of manufacturing if a large amount of the stabilized zirconium oxide, the cost of which is higher than the same using the monoclinic zirconium oxide.

PRIOR ART

Patent Document

[Patent Document 1] Japanese Provisional Patent Publication 2012-255052

[Patent Document 2] Japanese Provisional Patent Publication 1997-031440

SUMMARY OF INVENTION

Problems to be Resolve the Problems

This invention is to provide a friction material used for a disc brake pad which is manufactured by forming a NAO friction material composition that does not contain a copper component, which provide an excellent wear resistance and highly stable braking effectiveness even after being subjected to a history of high temperatures and high loads.

Means to Resolve the Problems

The inventors, after serious investigation, completed this invention as finding that the above-identified problem may be resolved by using the friction material composition for the friction material used for the disc brake pad which is manufactured by forming the NAO friction material composition that does not contain a copper component, which provides an excellent wear resistance and highly stable braking effectiveness even after being subjected to a history of high temperatures and high loads by using a friction material composition containing a predetermined amount of monoclinic zirconium oxide with a predetermined average particle diameter as an inorganic friction modifier and a predetermined amount and a predetermined ratio of a resilient graphitic carbon and a calcined coke both as a carbon type lubricant. The inventors further found that the wear resistance further improves by adding a predetermined amount of a layered mineral particle having a cleaving property as the inorganic friction modifier.

This invention relates to a friction material utilized for a disc brake pad, which is manufactured by forming the NAO friction material composition that does not contain a copper component and is based on the following technology.

(1) A friction material used for a disc brake pad, which is manufactured by forming a non-asbestos-organic (NAO) friction material composition that does not contain a copper component, wherein the friction material composition contains as an inorganic friction modifier, 10-40 weight % of a monoclinic zirconium oxide with an average particle diameter of 1-8 μm relative to the total amount of the friction material composition, 1.5 weight % or more of a resilient graphitic carbon as a carbon type lubricant relative to the total amount of the friction material composition, and a calcined coke where a total amount of the resilient graphite carbon and the calcined coke is 2-8 weight % relative to the total amount of the friction material composition and weight ratio of the resilient graphitic carbon and the calcined coke is 4:6-8:2.

(2) The friction material based on the above-(1), wherein, the friction material modifier contains 2-6 weight % of a layered mineral particle as the inorganic modifier relative to the total amount of the friction material composition.

(3) The friction material based on the above-(2), wherein the layered mineral particle is mica.

Advantage of the Invention

According to this invention, it is able to provide the friction material having an excellent wear resistance and highly stable braking effectiveness as the friction material used for the disc brake pad which is manufactured by forming the NAO friction material composition that does not contain the copper component.

EMBODIMENTS OF THE INVENTION

In the friction material of this invention used for a disc brake pad, which is manufactured by forming a non-asbestos-organic (NAO) friction material composition that does not contain a copper component, the friction material composition contains as an inorganic friction modifier, 10-40 weight % of a monoclinic zirconium oxide with an average particle diameter of 1-8 μm relative to the total amount of the friction material composition, 1.5 weight % or more of a resilient graphitic carbon as a carbon type lubricant relative to the total amount of the friction material composition and a calcined coke also as a carbon type lubricant, where a total amount of the resilient graphitic carbon and the calcined coke is 2-8 weight % and weight ratio of the resilient graphitic carbon and the calcined coke is 4:6-8:2.

By adding, as the inorganic friction modifier, relatively large amount, i.e., 10-40 weight %, of the monoclinic zirconium oxide, relative to the total amount of the friction material composition, with the small average particle diameter of 1-8 μm, a transfer film, which has the zirconium oxide as a main component, is able to be formed on a friction surface of a disc rotor, and therefore highly stable friction coefficient is obtained without adding the copper in the friction material composition.

Also, the present invention, as an average particle diameter, uses a 50% particle size (D50) measured by a laser diffraction method.

When the average particle diameter of the monoclinic zirconium oxide is less than 1 μm, the thickness of the transfer film is insufficient, and sufficient friction coefficient is not obtained. When the average particle diameter exceeds 8 μm, then the transfer film thickness is excessive, and the stability of the friction coefficient is reduced.

Also, there are problems existing when the amount of the monoclinic zirconium oxide contained therein is less than 10 weight % resulting that the transfer film thickness is insufficient, and sufficient friction coefficient cannot be obtained, but when the amount of the monoclinic zirconium oxide contained therein exceeds 40 weight %, the transfer film thickness is excessive, and the stability of the friction coefficient is reduced. The amount of the monoclinic zirconium oxide to be added is preferably 25-35 weight %. When the monoclinic zirconium oxide range is between 25-35 weight %, more stable film is established and excellent braking effectiveness can be obtained.

However, as described above, when relatively large amount of the monoclinic zirconium oxide is added to the friction material composition, there is a problem of reducing the wear resistance due to the fall out of the zirconium oxide when the friction material is subject to the history of high temperatures and high loads.

Then, in this invention, in order to inhibit the fall out of the monoclinic zirconium oxide from the friction material matrix, 1.5 weight % of the resilient graphitic carbon is added to the friction material composition relative to the total amount of the friction material composition.

The resilient graphitic carbon is formed by expanding and foaming the carbon material made of a carbonaceous mesophase or a coke and then by graphitizing at 1900-2700 centigrade so as to obtain 80-90 graphitization degree measured by X-ray diffraction.

A method of expanding and foaming may be performed by such as a method of treating the carbon material with nitric acid or mixed acid of nitric acid and sulfuric acid, then dissolving the carbon material in alkali aqueous solution, heat treating an aquamesophase obtained by deposition with acid aqueous solution at 300 centigrade, a method of rapid heat treating as contacting the carbon material with nitric acid, and a method of contacting the carbon material with nitrogen dioxide.

The resilient graphitic carbon is characterized to show a larger volume recovery ratio when the load is removed after applying a compressive load, and an example of which is such as RGC14A of Superior Graphite Corporation.

When the friction material composition after adding the resilient graphitic carbon is heat press formed, while the compressive load is applied to the resilient graphitic carbon, a thermosetting resin contained in the friction material composition as the binder is cured to form an outer shell of the friction material. As a result, a restoring force of the resilient graphitic carbon particle remains inside of the friction material.

When the friction material is subject to the history of high temperatures and high loads, the zirconium oxide performs crystal transition, and a gap is created around the zirconium oxide when the volume shrinks; however, at the same time, restoration of the resilient graphitic carbon closes the gap. Consequently, the zirconium oxide tends not to fall out from the friction material matrix, thereby inhibiting the reduction of the wear resistance.

However, the graphitization degree of the resilient graphitic carbon is 80-95%, and the lubricating effect is high. Accordingly, there is a problem that the friction coefficient tends to decrease.

Then, this invention also uses the calcined coke which has lower lubricating effect comparing to the resilient graphitic carbon.

The calcined coke is a coke obtained after high temperature processing of the raw coke to remove the volatile component, and an example of the calcined coke is such as TIMREX (registered TM) FC series by TIMCAL corporation.

The total amount of the resilient graphitic carbon and the calcined coke is set to 2-8 weight % relative to the total amount of the friction material composition, and also the weight ratio of the resilient graphitic carbon and the calcined coke is set to 4:6-8:2, thereby obtaining the sufficient friction coefficient.

In the friction material of this invention, in order to improve the wear resistance, 2-6 weight % of the layered mineral particle such as a talc, a mica, and a vermiculite as the inorganic friction modifier is added relative to the total amount of friction material composition.

The layered mineral particle is a mineral particle having a layered crystal structure with a cleavage surface and has a characteristic of causing a slight shearing between the layers as a stress in the direction of the layer.

If this layered mineral particle exists near the resilient graphitic carbon, when the resilient graphitic carbon attends to restore within the friction material, slight displacement occurs between the layers of the layered mineral particles existing around due to the restoring force.
This slight displacement helps to restore the resilient graphitic carbon, and the wear resistance is expected to be improving.

The friction material of this invention is made of the friction material composition containing above the monoclinic zirconium oxide, the resilient graphitic carbon, the calcined coke, and the layered mineral particle as well as materials that are generally used for the friction material such as the binder, the fiber base material, the lubricant, the inorganic friction modifier, the organic friction modifier, the pH adjuster, and the filler.

As the binder, the binder normally used in a friction material such as a straight phenolic resin, a modified resin obtained by modifying a phenolic resin with various oil such as cashew oil and silicone oil and various types of elastomers such an acrylic rubber, an aralkyl modified phenolic resin obtained by reacting a phenolic compound, an aralkyl ether compound, and an aldehyde compound, and a thermosetting resin obtained by dispersing such as various elastomers and a fluorine-containing polymer to the phenol resin can be mentioned. In this invention, one type of the above-resin alone or any combination of two or more types of the above-resins may be used. The amount of the binder contained in the friction material composition relative to the total amount of the friction material composition is preferably 4-12 weight %, more preferably 5-8 weight %.

As the fiber base, organic fibers normally used in the friction material such as an aramid fiber, a cellulose fiber, a poly p-phenylenebenzobisoxazole fiber, and an acrylic fiber can be mentioned. In this invention, one type of the above-fiber alone or any combination of two or more types of the above-fiber may be used. The amount of the fiber base material contained in the friction material composition relative to the total amount of the friction material composition is preferably 1-7 weight %, more preferably 2-4 weight %.

As the lubricant, a lubricant normally used in the friction material such as a metallic sulfide type lubricant such as the above-described resilient graphitic carbon and the calcined coke as well as a molybdenum disulfide, a zinc sulfide, a tin sulfide, and a composite metal sulfide, and a carbon type lubricant such as an artificial graphite, a natural graphite, a flaky graphite, an active carbon, and a crushed polyacrylonitrile fiber powder can be mentioned. In this invention, one type of the above-lubricant alone or any combination of two or more types of the above-lubricant may be used. The amount of the lubricant including the above-resilient graphitic carbon and the calcined coke together contained in the friction material composition relative to the total amount of the friction material composition is preferably 3-15 weight %, more preferably 5-13 weight %.

As the inorganic friction modifier, other than the above the monoclinic zirconium oxide and the layered mineral particle, particle inorganic friction modifiers such as a triiron tetroxide, a calcium silicate hydrate, a glass bead, a magnesium oxide, a stabilized zirconium oxide, a zirconium silicate, a y alumina, an a alumina, a silicate carbide, a platy shape titanate, an irregular shape titanate, in which the titanate may be such as a potassium titanate, a lithium potassium titanate, and a magnesium potassium titanate, and fiber inorganic friction modifiers such as a wollastonite, a sepiolite, a basalt fiber, a glass fiber, a biosoluable artificial mineral fiber, and a rock wool can be mentioned. In this invention, one type of the above-inorganic friction modifier alone or any combination of two or more types of the above-inorganic friction modifiers may be used. The amount of the inorganic friction modifier including the above-monoclinic zirconium oxide and the layered mineral particle together contained in the friction material composition relative to the total amount of the friction material composition is preferably 30-70 weight %, more preferably 40-60 weight %.

As the organic friction modifier, the organic friction modifier normally used in the friction material such as a cashew dust, a pulverized powder of a tire tread rubber and a vulcanized rubber powder or an unvulcanized rubber powder such as a nitrile rubber, an acrylic rubber, a silicone rubber, and a butyl rubber can be mentioned. In this invention, one type or the above-organic friction modifier alone or any combination of two or more types of the above-organic friction modifier may be used. The amount of the organic friction modifier contained in the friction material composition relative to the total amount of the friction material composition is preferably 2-8 weight %, more preferably 3-7 weight %.

As the pH adjuster, the pH adjuster normally used in the friction material such as a calcium hydroxide may be used. The amount of the pH adjuster contained in the friction material composition relative to the total amount of the friction material composition is preferably 1-6 weight %, more preferably 2-4 weight %.

Fillers such as a barium sulfate and a calcium carbonate may be used as remaining materials of the friction material composition.

The friction material of this invention used for the disc brake is manufactured through a mixing step to obtain a raw friction material mixture by uniformly mixing the predetermined amount of the friction material composition using a mixer, a heat press forming step to obtain a molded product by heat press forming the raw friction material mixture positioned in the heat forming die superposed on a back plate which was separately, in advance, cleaned, surface treated, and adhesive applied thereon to obtain a molded product, a heat treatment step of heating the molded product to complete the cure reaction of the binder thereon, an electrostatic powder coating step of applying the powder coating thereon, a baking step of baking the coating thereon, and a grinding step of forming the friction surface. Also, after the heat press forming step, a heat treatment step of combining the coating step and the baking step may be followed by the grinding step.

As necessary, prior to the heat press forming step, a granulation step of granulating the raw friction material mixture, a kneading step of kneading the raw friction material mixture, and a pre-forming step of forming an unfinished preformed article by positioning the raw friction material mixture or the granulated raw friction material mixture obtained through the granulation step and the kneaded raw friction material mixture obtained through the kneading step into the pre-forming die, are performed. In addition, after the heat press forming step, the scorching step may be performed.

This invention is concretely explained using the embodiments and comparative examples are shown in the following sections, but this invention is not limited to the following embodiments.

Embodiments 1-20 and Comparative Examples 1-13 for the Manufacturing Method of Friction Material The friction material composition of the components shown in the TABLE 1, TABLE 2, and TABLE 3 is mixed by a Loedige mixer for about 5 minutes and is press for 10 seconds under 30 MPa in the preforming metal die to obtain a preforming article. The obtained preforming article is placed on a steel back plate which is, in advance, washed, surface-treated, and adhesive-applied, and is formed within a heat forming die for about 10 munities at 150 centigrade of the forming temperature under 40 MPa of the forming pressure, and then the heat treatment (post curing) at 200 centigrade is conducted on the obtained article for 5 hours, and a friction surface is formed by grinding to complete the disc brake pad for a passenger vehicle (Embodiments 1-20 and Comparative Examples 1-13).

TABLE 1

DRAWING NO.: 000002

| | | | Embodiments | | | | | | | | | |
|---|---|---|---|---|---|---|---|---|---|---|---|---|
| | | | 1 | 2 | 3 | 4 | 5 | 6 | 7 | 8 | 9 | 10 |
| Binder | | Straight phenolic resin | 5 | 5 | 5 | 5 | 5 | 5 | 5 | 5 | 5 | 5 |
| | | Silicone rubber modified phenolic resin | 2 | 2 | 2 | 2 | 2 | 2 | 2 | 2 | 2 | 2 |
| Fiber base Material | | Aramid fiber | 3 | 3 | 3 | 3 | 3 | 3 | 3 | 3 | 3 | 3 |
| Lubricant | Carbon type lubricant | Resilient graphitic carbon | 3 | 3 | 3 | 3 | 3 | 3 | 3 | 3 | 3 | 3 |
| | | Calcined coke | 2 | 2 | 2 | 2 | 2 | 2 | 2 | 2 | 2 | 2 |
| | | Artificial graphite | 2 | 2 | 2 | 2 | 2 | 2 | 2 | 2 | 2 | 2 |
| | Metallic sulfide type lubricant | Zinc sulfide | 4 | 4 | 4 | 4 | 4 | 4 | 4 | 4 | 4 | 4 |
| Inorganic friction modifier | Particle inorganic friction modifier | Monoclinic zirconium oxide (average particle diameter = 0.5 μm) | | | | | | | | | | |
| | | Monoclinic zirconium oxide (average particle diameter = 1.0 μm) | | | | | | 30 | | | | |
| | | Monoclinic zirconium oxide (average particle diameter = 3.0 μm) | 10 | 20 | 30 | 40 | | | 30 | 30 | 30 | 30 |
| | | Monoclinic zirconium oxide (average particle diameter = | | | | | | | | 30 | | |

TABLE 1-continued

|  |  |  | Embodiments | | | | | | | | | |
|---|---|---|---|---|---|---|---|---|---|---|---|---|
|  |  |  | 1 | 2 | 3 | 4 | 5 | 6 | 7 | 8 | 9 | 10 |
|  |  | 8.0 μm) Monoclinic zirconium oxide (average particle diameter = 9.0 μm) |  |  |  |  |  |  |  |  |  |  |
|  |  | Zirconium silicate | 2 | 2 | 2 | 2 | 2 | 2 | 2 | 2 | 2 | 2 |
|  |  | Mica | 4 | 4 | 4 | 4 | 4 | 4 | 1 | 2 | 6 | 7 |
|  |  | Vermiculite |  |  |  |  |  |  |  |  |  |  |
|  |  | Potassium hexatitanate | 18 | 18 | 18 | 18 | 18 | 18 | 18 | 18 | 18 | 18 |
|  | Fiber inorganic friction modifier | Rock wool (biosoluble) | 1 | 1 | 1 | 1 | 1 | 1 | 1 | 1 | 1 | 1 |
| Organic friction modifier |  | Pulverized powder of tire tread rubber | 1 | 1 | 1 | 1 | 1 | 1 | 1 | 1 | 1 | 1 |
|  |  | Cashew dust | 3 | 3 | 3 | 3 | 3 | 3 | 3 | 3 | 3 | 3 |
| pH adjuster |  | Calcium hydroxide | 3 | 3 | 3 | 3 | 3 | 3 | 3 | 3 | 3 | 3 |
| Filler |  | Barium sulfide | 37 | 27 | 17 | 7 | 17 | 17 | 20 | 19 | 15 | 14 |
| Total |  |  | 100 | 100 | 100 | 100 | 100 | 100 | 100 | 100 | 100 | 100 |
| Information |  | Total of resilient graphitic carbon and calcined coke | 5 | 5 | 5 | 5 | 5 | 5 | 5 | 5 | 5 | 5 |
|  |  | Weight ratio of resilient graphitic carbon | 6.0 | 6.0 | 6.0 | 6.0 | 6.0 | 6.0 | 6.0 | 6.0 | 6.0 | 6.0 |
|  |  | Weight ratio of calcined coke | 4.0 | 4.0 | 4.0 | 4.0 | 4.0 | 4.0 | 4.0 | 4.0 | 4.0 | 4.0 |

TABLE 2

|  |  |  | Embodiments | | | | | | | | | |
|---|---|---|---|---|---|---|---|---|---|---|---|---|
|  |  |  | 11 | 12 | 13 | 14 | 15 | 16 | 17 | 18 | 19 | 20 |
| Binder |  | Straight phenolic resin | 5 | 5 | 5 | 5 | 5 | 5 | 5 | 5 | 5 | 5 |
|  |  | Silicone rubber modified phenolic resin | 2 | 2 | 2 | 2 | 2 | 2 | 2 | 2 | 2 | 2 |
| Fiber base Material |  | Aramid fiber | 3 | 3 | 3 | 3 | 3 | 3 | 3 | 3 | 3 | 3 |
| Lubricant | Carbon type lubricant | Resilient graphitic carbon | 3 | 1.5 | 2 | 3 | 3 | 4 | 4 | 5 | 5 | 6 |
|  |  | Calcined coke | 2 | 0.5 | 1 | 1 | 4 | 1 | 4 | 2 | 3 | 2 |
|  |  | Artificial graphite | 2 | 2 | 2 | 2 | 2 | 2 | 2 | 2 | 2 | 2 |
|  | Metallic sulfide type lubricant | Zinc sulfide | 4 | 4 | 4 | 4 | 4 | 4 | 4 | 4 | 4 | 4 |
| Inorganic friction modifier | Particle inorganic friction modifier | Monoclinic zirconium oxide (average particle |  |  |  |  |  |  |  |  |  |  |

TABLE 2-continued

Embodiments

| | | 11 | 12 | 13 | 14 | 15 | 16 | 17 | 18 | 19 | 20 |
|---|---|---|---|---|---|---|---|---|---|---|---|
| | diameter = 0.5 μm) Monoclinic zirconium oxide (average particle diameter = 1.0 μm) | | | | | | | | | | |
| | Monoclinic zirconium oxide (average particle diameter = 3.0 μm) | 30 | 30 | 30 | 30 | 30 | 30 | 30 | 30 | 30 | 30 |
| | Monoclinic zirconium oxide (average particle diameter = 8.0 μm) | | | | | | | | | | |
| | Monoclinic zirconium oxide (average particle diameter = 9.0 μm) | | | | | | | | | | |
| | Zirconium silicate | 2 | 2 | 2 | 2 | 2 | 2 | 2 | 2 | 2 | 2 |
| | Mica | | 4 | 4 | 4 | 4 | 4 | 4 | 4 | 4 | 4 |
| | Vermiculite | 4 | | | | | | | | | |
| | Potassium hexatitanate | 18 | 18 | 18 | 18 | 18 | 18 | 18 | 18 | 18 | 18 |
| Fiber inorganic friction modifier | Rock wool (biosoluble) | 1 | 1 | 1 | 1 | 1 | 1 | 1 | 1 | 1 | 1 |
| Organic friction modifier | Pulverized powder of tire tread rubber | 1 | 1 | 1 | 1 | 1 | 1 | 1 | 1 | 1 | 1 |
| | Cashew dust | 3 | 3 | 3 | 3 | 3 | 3 | 3 | 3 | 3 | 3 |
| pH adjuster | Calcium hydroxide | 3 | 3 | 3 | 3 | 3 | 3 | 3 | 3 | 3 | 3 |
| Filler | Barium sulfide | 17 | 20 | 19 | 18 | 15 | 17 | 14 | 15 | 14 | 14 |
| Total | | 100 | 100 | 100 | 100 | 100 | 100 | 100 | 100 | 100 | 100 |
| Information | Total of resilient graphitic carbon and calcined coke | 5 | 2 | 3 | 4 | 7 | 5 | 8 | 7 | 8 | 8 |
| | Weight ratio of resilient graphitic carbon | 6.0 | 7.5 | 6.7 | 7.5 | 4.3 | 8.0 | 5.0 | 7.1 | 6.3 | 7.5 |
| | Weight ratio of calcined coke | 4.0 | 2.5 | 3.3 | 2.5 | 5.7 | 2.0 | 5.0 | 2.9 | 3.8 | 2.5 |

TABLE 3

Comparative Examples

| | | 1 | 2 | 3 | 4 | 5 | 6 | 7 | 8 | 9 | 10 | 11 | 12 | 13 |
|---|---|---|---|---|---|---|---|---|---|---|---|---|---|---|
| Binder | Straight phenolic resin | 5 | 5 | 5 | 5 | 5 | 5 | 5 | 5 | 5 | 5 | 5 | 5 | 5 |

TABLE 3-continued

| | | | \multicolumn{13}{c}{Comparative Examples} |
| | | | 1 | 2 | 3 | 4 | 5 | 6 | 7 | 8 | 9 | 10 | 11 | 12 | 13 |
|---|---|---|---|---|---|---|---|---|---|---|---|---|---|---|---|
| | | Silicone rubber modified phenolic resin | 2 | 2 | 2 | 2 | 2 | 2 | 2 | 2 | 2 | 2 | 2 | 2 | 2 |
| Fiber base Material | | Aramid fiber | 3 | 3 | 3 | 3 | 3 | 3 | 3 | 3 | 3 | 3 | 3 | 3 | 3 |
| Lubricant | Carbon type lubricant | Resilient graphitic carbon | 3 | 3 | 3 | 3 | 1 | 1.5 | 3 | 4 | 5 | 5 | 6 | 6 | 7 |
| | | Calcined coke | 2 | 2 | 2 | 2 | 1 | 4 | 5 | 5 | 1 | 4 | 1 | 3 | 1 |
| | | Artificial graphite | 2 | 2 | 2 | 2 | 2 | 2 | 2 | 2 | 2 | 2 | 2 | 2 | 2 |
| | Metallic sulfide type lubricant | Zinc sulfide | 4 | 4 | 4 | 4 | 4 | 4 | 4 | 4 | 4 | 4 | 4 | 4 | 4 |
| Inorganic friction modifier | Particle inorganic friction modifier | Monoclinic zirconium oxide (average particle diameter = 0.5 μm) | | | 30 | | | | | | | | | | |
| | | Monoclinic zirconium oxide (average particle diameter = 1.0 μm) | | | | | | | | | | | | | |
| | | Monoclinic zirconium oxide (average particle diameter = 3.0 μm) | 9 | 41 | | | 30 | 30 | 30 | 30 | 30 | 30 | 30 | 30 | 30 |
| | | Monoclinic zirconium oxide (average particle diameter = 8.0 μm) | | | | | | | | | | | | | |
| | | Monoclinic zirconium oxide (average particle diameter = 9.0 μm) | | | | 30 | | | | | | | | | |
| | | Zirconium silicate | 2 | 2 | 2 | 2 | 2 | 2 | 2 | 2 | 2 | 2 | 2 | 2 | 2 |
| | | Mica | 4 | 4 | 4 | 4 | 4 | 4 | 4 | 4 | 4 | 4 | 4 | 4 | 4 |
| | | Vermiculite | | | | | | | | | | | | | |
| | | Potassium hexatitanate | 18 | 18 | 18 | 18 | 18 | 18 | 18 | 18 | 18 | 18 | 18 | 18 | 18 |
| | Fiber inorganic friction modifier | Rock wool (biosoluble) | 1 | 1 | 1 | 1 | 1 | 1 | 1 | 1 | 1 | 1 | 1 | 1 | 1 |
| Organic friction modifier | | Pulverized powder of tire tread rubber | 1 | 1 | 1 | 1 | 1 | 1 | 1 | 1 | 1 | 1 | 1 | 1 | 1 |

TABLE 3-continued

|  |  | Comparative Examples | | | | | | | | | | | | |
|---|---|---|---|---|---|---|---|---|---|---|---|---|---|
|  |  | 1 | 2 | 3 | 4 | 5 | 6 | 7 | 8 | 9 | 10 | 11 | 12 | 13 |
| pH adjuster | Cashew dust | 3 | 3 | 3 | 3 | 3 | 3 | 3 | 3 | 3 | 3 | 3 | 3 | 3 |
|  | Calcium hydroxide | 3 | 3 | 3 | 3 | 3 | 3 | 3 | 3 | 3 | 3 | 3 | 3 | 3 |
| Filler | Barium sulfide | 38 | 6 | 17 | 17 | 20 | 16.5 | 14 | 13 | 16 | 13 | 15 | 13 | 14 |
| Total |  | 100 | 100 | 100 | 100 | 100 | 100 | 100 | 100 | 100 | 100 | 100 | 100 | 100 |
|  | Total of resilient graphitic carbon and calcined coke | 5 | 5 | 5 | 5 | 2 | 5.5 | 8 | 9 | 6 | 9 | 7 | 9 | 8 |
| Information | Weight ratio of resilient graphitic carbon | 6.0 | 6.0 | 6.0 | 6.0 | 5.0 | 2.7 | 3.8 | 4.4 | 8.3 | 5.6 | 8.6 | 6.7 | 8.8 |
|  | Weight ratio of calcined coke | 4.0 | 4.0 | 4.0 | 4.0 | 5.0 | 7.3 | 6.3 | 5.6 | 1.7 | 4.4 | 1.4 | 3.3 | 1.3 |

The obtained friction material was evaluated with respect to the braking performance under high speed and high load condition, stability, wear resistance, and formability. The evaluation results are shown in TABLE 4, TABLE 5, and TABLE 6, and the evaluation standard is shown in TABLE 7.

TABLE 4

|  |  | Embodiments | | | | | | | | | |
|---|---|---|---|---|---|---|---|---|---|---|---|
|  |  | 1 | 2 | 3 | 4 | 5 | 6 | 7 | 8 | 9 | 10 |
| Evaluation Result | Braking effectiveness | Δ | ○ | ◎ | ○ | ○ | Δ | ◎ | ◎ | ◎ | ○ |
|  | Stability of Braking effectiveness | Δ | ◎ | ◎ | Δ | ○ | Δ | ◎ | ◎ | ◎ | ◎ |
|  | Wear resistance | ◎ | ◎ | ◎ | ○ | ◎ | ○ | Δ | ○ | ○ | Δ |
|  | Product appearance | ◎ | ◎ | ◎ | ○ | ○ | ◎ | ◎ | ◎ | ◎ | ◎ |

TABLE 5

|  |  | Embodiments | | | | | | | | | |
|---|---|---|---|---|---|---|---|---|---|---|---|
|  |  | 11 | 12 | 13 | 14 | 15 | 16 | 17 | 18 | 19 | 20 |
| Evaluation Result | Effectiveness | ○ | ○ | ○ | ○ | ○ | ○ | Δ | ○ | Δ | Δ |
|  | Stability of Braking effectiveness | ◎ | ○ | ○ | ○ | Δ | Δ | ○ | Δ | Δ | Δ |
|  | Wear resistance | ◎ | Δ | ○ | ○ | ◎ | ○ | ◎ | ○ | ◎ | ◎ |
|  | Product appearance | ◎ | ◎ | ◎ | ◎ | Δ | ◎ | Δ | Δ | Δ | Δ |

TABLE 6

|  |  | Comparative Examples | | | | | | | | | | | | |
|---|---|---|---|---|---|---|---|---|---|---|---|---|---|---|
|  |  | 1 | 2 | 3 | 4 | 5 | 6 | 7 | 8 | 9 | 10 | 11 | 12 | 13 |
| Evaluation Result | Effectiveness | X | ○ | X | Δ | Δ | ○ | Δ | — | Δ | — | Δ | — | X |
|  | Stability of Braking effectiveness | Δ | X | Δ | X | Δ | X | X | — | X | — | X | — | X |
|  | Wear resistance | ◎ | Δ | ◎ | ○ | X | Δ | ○ | — | ○ | — | Δ | — | Δ |
|  | Product appearance | ◎ | Δ | Δ | ◎ | ◎ | ◎ | Δ | X | ○ | X | Δ | X | Δ |

TABLE 7

| Evaluation items Evaluation method | Braking effectiveness Standard: JASO C406 AMS (German Automobile Journal, "Auto Motor Unt Sport") High Speed Pattern Simulation Test 150% Condition 240 km/h → 5 km/h (Deceleration 0.6 G) × 1 cycle<br><br>Minimum value of average μ at final braking | Wear resistance<br><br><br><br><br><br><br><br>Amount of friction material wear | Stability JASO C406 Passenger Car- Braking Device - Dynamometer Test<br><br><br><br>Procedures Second effectiveness average μ | Product appearance Visual confirmation of friction material<br><br><br><br>surface condition after heat press forming |
|---|---|---|---|---|
| ⊚ | 0.20 or more | less than 2.0 mm | 0.40 or more | No Wrinkle and no crack |
| ○ | less than 0.20 but 0.15 or more | 2.0 mm or more but less than 3.0 mm | 0.37 or more but less than 0.40 | minimum wrinkle, no crack |
| Δ | less than 0.15 but 0.10 or more | 3.0 mm or more but less than 4.0 mm | 0.34 or more but less than 0.37 | minimum wrinkle, minimum crack |
| X | less than 0.10 | 4.0 mm or more | less than 0.34 | wrinkle, crack |
| — | No evaluation: product appearance evaluation = X | | | |

As seen in each TABLE, the composition, which can satisfy the requirements of this invention, has the excellent product appearance after forming and shows the excellent wear resistance and the high braking effectiveness after being subject to the history of high temperatures and high loads, and the stable braking effectiveness, thereby receiving the evaluation results.

INDUSTRIAL APPLICABILITY

This invention provides the friction material used for the disc brake pad, which is manufactured by forming a non-asbestos-organic (NAO) friction material composition, which is able to provide an excellent wear resistance and highly stable braking effectiveness after being subject to the history of high temperatures and high loads while satisfying laws and regulations relating to the required amount of the content of a copper component, thereby providing a great practical value.

The invention claimed is:

1. A friction material used for a disc brake pad, which is manufactured by forming a non-asbestos-organic (NAO) friction material composition that does not contain a copper component, wherein said friction material composition contains as an inorganic friction modifier, 10-40 weight % of a monoclinic zirconium oxide with an average particle diameter of 1-8 μm relative to the total amount of the friction material composition, 1.5 weight % or more of a resilient graphitic carbon as a carbon type lubricant relative to the total amount of the friction material composition and a calcined coke also as a carbon type lubricant, where a total amount of the resilient graphitic carbon and the calcined coke is 2-8 weight % relative to the total amount of the friction material composition, and a weight ratio of the resilient graphitic carbon and the calcined coke is 4:6-8:2.

2. The friction material according to claim 1, wherein the friction material composition contains 2-6 weight % of a layered mineral particle as the inorganic friction modifier relative to the total amount of the friction material composition.

3. The friction material according to claim 2, wherein the layered mineral particle is mica.

\* \* \* \* \*